Figure 1:
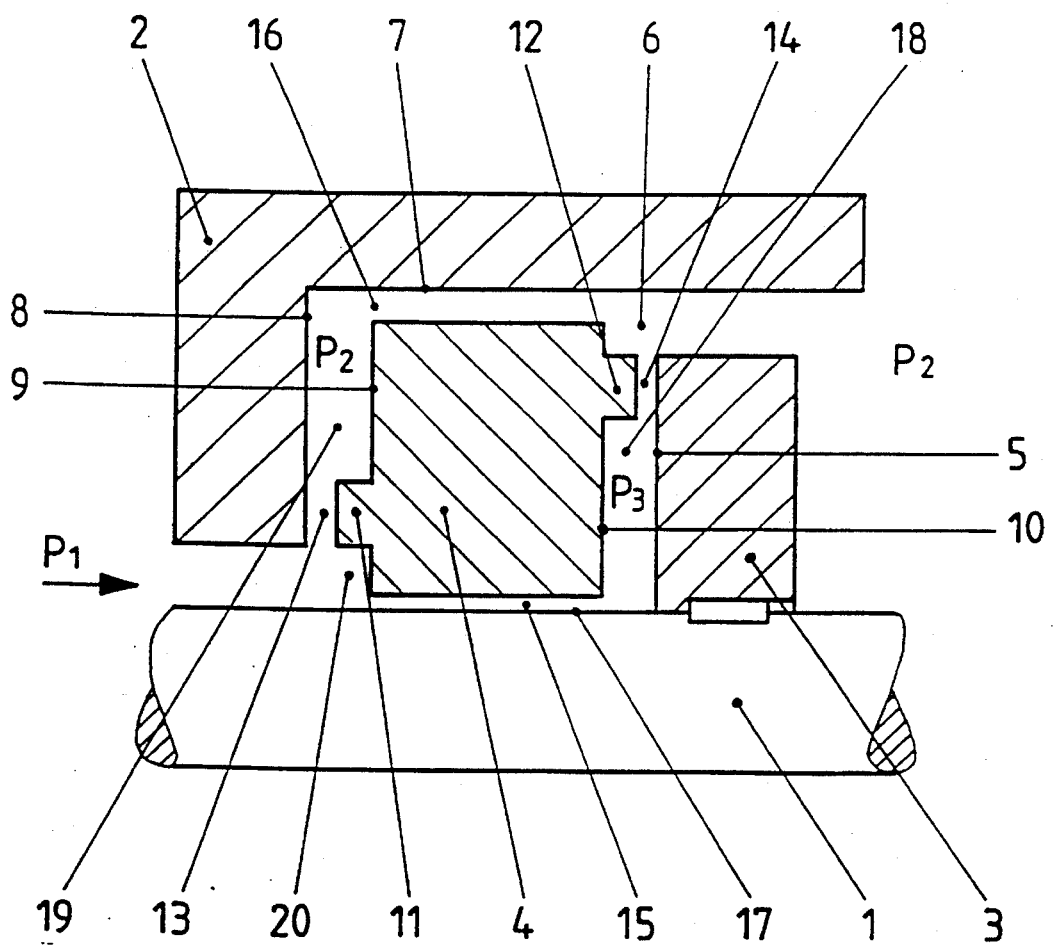

United States Patent [19]

Gaffal

[11] Patent Number: 5,518,256
[45] Date of Patent: May 21, 1996

[54] FLOATING-RING SEAL

[75] Inventor: Karl Gaffal, Freinsheim, Germany

[73] Assignee: KSB Aktiengesellschaft, Frankenthal, Germany

[21] Appl. No.: 313,165

[22] PCT Filed: Mar. 24, 1993

[86] PCT No.: PCT/EP93/00705

§ 371 Date: Oct. 7, 1994

§ 102(e) Date: Oct. 7, 1994

[87] PCT Pub. No.: WO95/21464

PCT Pub. Date: Oct. 28, 1993

[30] Foreign Application Priority Data

Apr. 8, 1992 [DE] Germany .......................... 42 11 809.3

[51] Int. Cl.$^6$ .................................................. F16J 15/447
[52] U.S. Cl. ........................ 277/173; 277/174; 277/176; 277/57
[58] Field of Search ........................ 277/27, 53, 57, 277/83, 173, 174, 175, 176

[56] References Cited

U.S. PATENT DOCUMENTS

| 2,912,265 | 11/1959 | Brummer | 277/83 |
| 3,046,648 | 7/1962 | Kelly | 277/53 |
| 3,476,397 | 11/1969 | Thoren et al. | 277/83 |
| 3,720,419 | 3/1973 | Adelizzi | 277/83 |
| 4,199,152 | 4/1980 | Catterfeld . | |
| 4,643,639 | 2/1987 | Caine | 277/173 |
| 4,685,684 | 8/1987 | Ballard | 277/57 |
| 5,028,054 | 7/1991 | Peach | 277/57 |
| 5,037,114 | 8/1991 | Gray . | |

FOREIGN PATENT DOCUMENTS

| 0039435 | 11/1981 | European Pat. Off. . | |
| 1912964 | 9/1970 | Germany | 277/83 |
| 1937418 | 2/1971 | Germany . | |
| 2244213 | 6/1973 | Germany | 277/83 |
| 1314167 | 5/1987 | U.S.S.R. | 277/173 |

Primary Examiner—Scott W. Cummings
Attorney, Agent, or Firm—Darby & Darby

[57] ABSTRACT

The invention concerns a floating-ring seal in which the ring is disposed so that it can move freely inside an annular chamber. Of the four walls of the chamber enclosing the ring, two walls disposed at an angle to each other are stationary while the walls opposite them rotate at the speed of the drive. As a result of the freedom of motion of the floating ring and the drive and braking torques acting on it through the walls, the ring rotates at a speed which is lower than the speed of the rotating components.

9 Claims, 4 Drawing Sheets 5,518,256

FLOATING-RING SEAL

The invention relates to a floating-ring seal in accordance with the generic part of the main claim.

Centrifugal pumps with separate driving motors have at least one shaft seal that is intended to help prevent the discharge of the pumping medium from the interior space of the pump along the shaft. Additional sealing systems are provided inside the pump to limit internal leakage currents.

The usual rotating mechanical seals used as shaft seals in centrifugal pumps are limited to applications with running speeds less than 50 m/sec. Beyond that speed range the serviceable life is very unsatisfactory. Therefore, for more rapidly rotating centrifugal pumps, rigid, non-contact choke gaps or so-called floating-ring seals have gained acceptance. However, both seal designs have the disadvantage of a high loss of efficiency. Moreover, attempts to construct choke gaps between a turning and a rotating part that are as narrow as possible are subject to technical limitations. For example, multistage centrifugal pumps with a horizontal shaft that are used to convey hot media are subject to operating conditions during which blocking of the rotor can occur as a result of excessively-narrow impeller choke gaps when there are distortions of the casing or rotor. To avoid that problem, very expensive structural measures are known from prior art. The problem can be avoided by using large choke gaps, but that results in significant losses of efficiency.

A floating-ring seal for shaft seals of the type described above is known from U.S. Pat. No. 3 213 798, in which floating rings are arranged in separate chambers and surround the shaft with clearance. In that fashion a choke gap is formed between the interior diameter of the floating rings and the shaft, the effect of which is relatively unreliable due to the multiplicity of choke gaps. However because of the effect of pressure, one face of the sealing rings rubs against their chamber wall, so that at high speeds there are significant abrasion problems. U.S. Pat. No. 3 779 667 shows another floating ring that is arranged with clearance in its chamber and used as an impeller split ring. Due to the pressure ratios inside the pump, the face of the floating ring that is opposite the pressure is pressed against the associated surface of the casing wall. Therefore, the non-contact mobility when at rest is limited during operation. This approach may be feasible for small circumferential speeds, but it fails at higher circumferential speeds and greater radial rotor vibrations.

The aim of the invention is to develop a sealing system for centrifugal pumps that are driven at a high speed, which with low leakage currents have a long serviceable life and are not sensitive to rotor distortions and vibrations.

That aim is achieved through the recitations contained in the generic part of the main claim. The principle of the floating ring that moves freely and without contact during operation can be implemented uniformly between the rotating and stationary pump components, on which pressure differences are produced. Thanks to the regulating gaps, each floating ring arranges itself without contact in the chamber enclosing it. Because it does not come into contact, it can be used at very high circumferential speeds. The two walls disposed at an angle to each other and rotating at the speed of the drive, as well as the stationary walls opposite those walls, cause the floating ring to rotate inside its chamber at a moderate speed that corresponds to approximately half of the speed of the drive. Consequently, during the worst cases of starting up or turning off the motor, any potential contact will occur at only a maximum of half the speed of the drive. Compared with floating rings of prior art, in which the relative speed between the stationary and rotating parts corresponds to the speed of the drive, the abrasion resistance of the floating rings in accordance with the invention is extremely high and enables them to be used without difficulty at high speed ranges.

The embodiments described in claims 2 or 3 have the advantage that the regulating gaps can be kept extremely small. That provides a significant reduction in the so-called leak rate, which increases efficiency and ultimately provides a decisive improvement in the energy balance. Another advantage results during the occurrence of shaft distortions. A potential light touching of surfaces structured in that way would have almost no negative effects, since as a result of the honeycombed surface, binding of the parts that come into contact with each other does not occur. An additional advantage is provided by the very high damping effect of rings constructed in that way, which is why vibrations of the rotating system can be very effectively influenced. The addition of the two radial gap widths provides greater freedom of movement of the rotor against light radial touching.

Due to its small dimensions, it is possible to use an individual floating ring as a impeller split ring. Successive connection of multiple floating rings leads to their known use as shaft seal. Moreover, an embodiment in accordance with claim 4 allows the use of such a floating-ring seal as a vibration-damping member within the rotating system.

A further embodiment according to which projections affixed to the walls or to the floating ring faces are inserted into appropriate recesses in the corresponding surfaces improves the use of the floating ring as impeller split ring with additional axial and radial choke gaps in the case of axial rotor movements.

The embodiments of Claims 6 and 7 also serve the same purpose.

Figure 2:
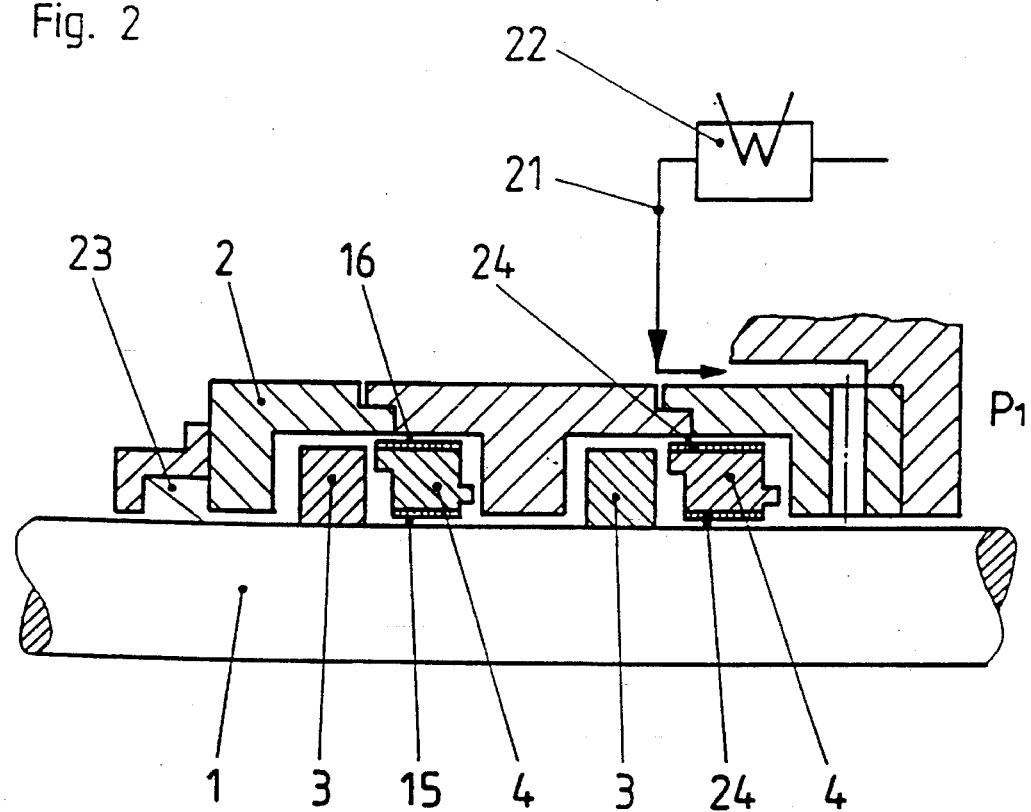
Figure 3:
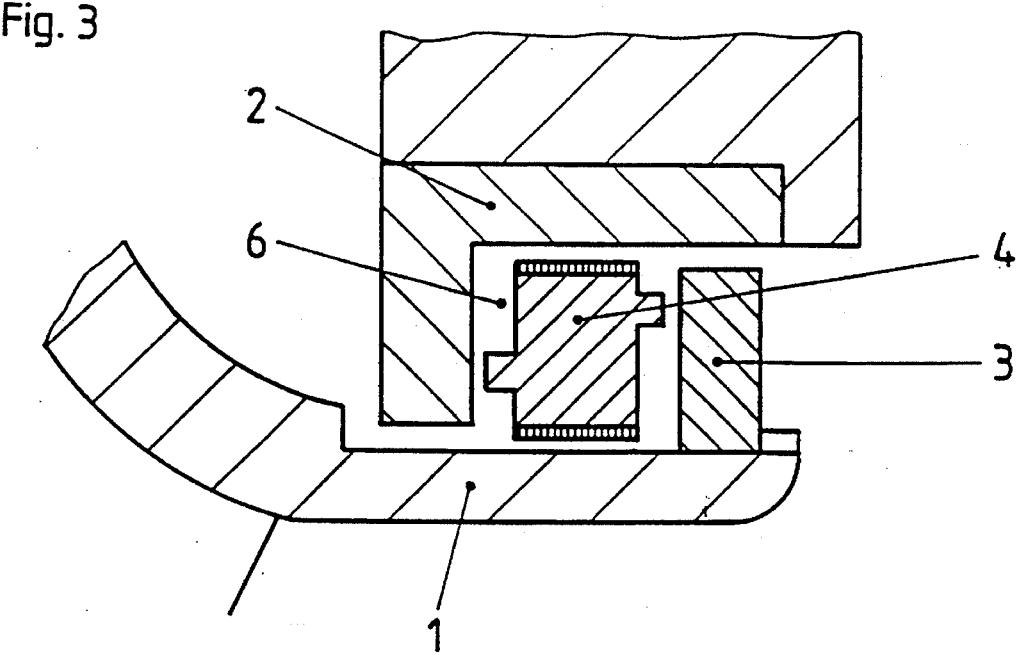
Figure 4:
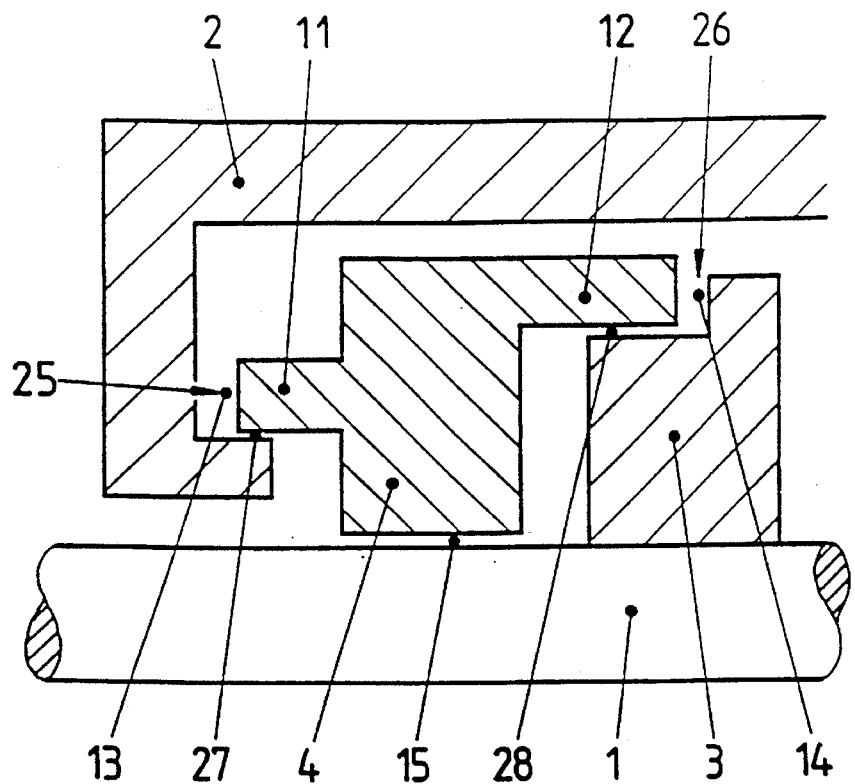
Figure 5:
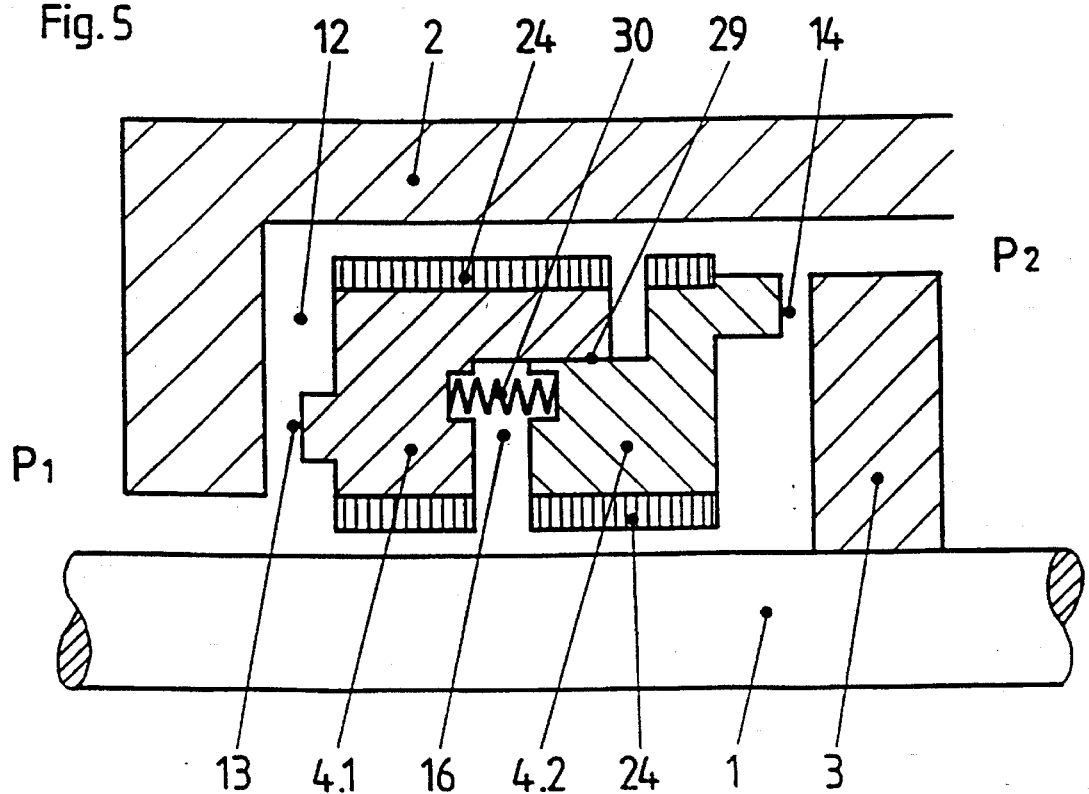
Figure 6:
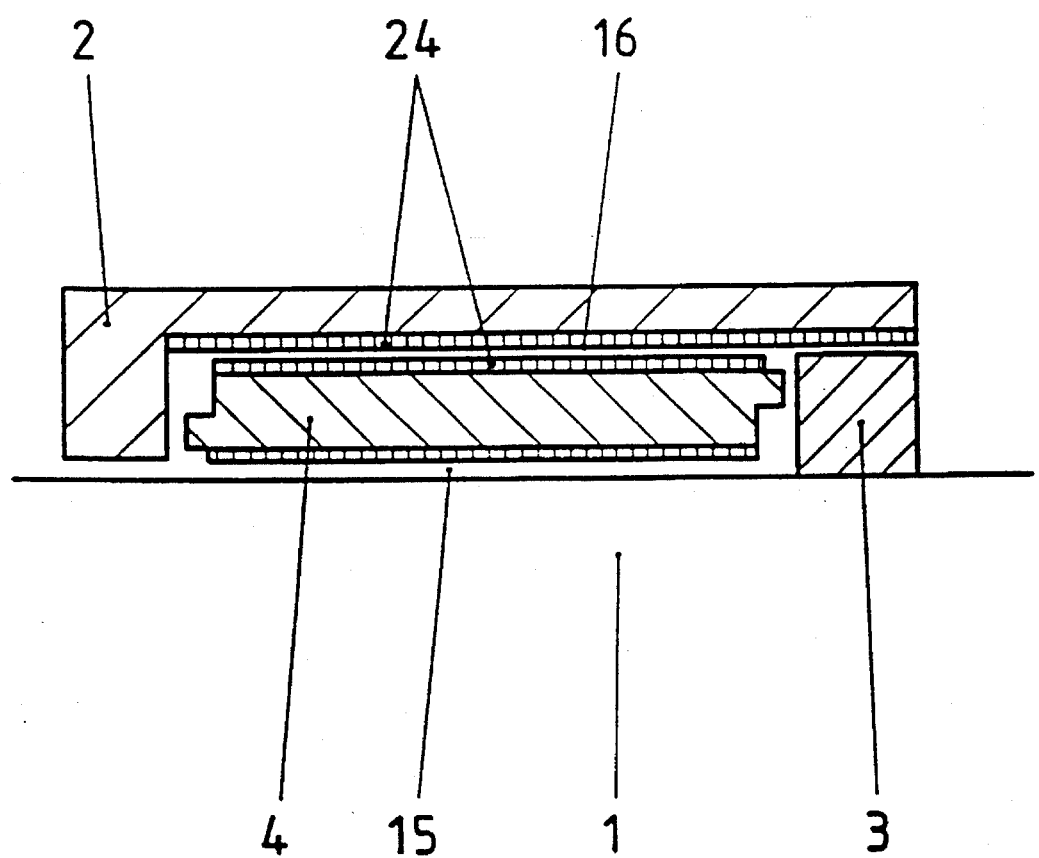

Examples of embodiments of the invention are shown in the drawings and are described in greater detail below in reference to the drawings, in which FIG. 1 shows an individual illustration of a floating ring and the parts of the casing surrounding it, FIG. 2 shows a mounting arrangement of a double floating-ring seal, FIG. 3 shows a mounting arrangement of an impeller split ring, FIGS. 4 and 5 show mounting arrangements with high degrees of axial clearance of the rotating components, and FIG. 6 shows a mounting arrangement as a damping element.

The functional principle of the floating-ring seal is shown in FIG. 1. There is a pressure difference (P1) and (P2) between a rotating component (1), which may be a shaft, impeller, or the like, and a stationary casing (2). A potential leakage current between the chambers under pressure (P1) or (P2) resulting from the pressure differences should be kept as low as possible. For that purpose, the rotating component has a disk (3) secured to it so that it seals, whose wall (5) facing a floating ring (4), along with the surface of the component (1), forms the rotating walls disposed at an angle to each other of an annular chamber (6) of the floating-ring seal. The walls (7, 8) opposite the rotating walls and disposed in the stationary part of the casing (2) form the stationary walls disposed at an angle to each other of the annular chamber (6). On the faces (9, 10) of the floating ring (4) there are projections (11, 12) arranged at different diameters. The projection facing the high-pressure side (P1) is arranged at a smaller diameter and forms a regulating gap (13), whereas the projection (12) facing the low-pressure side (P2) forms, along with the wall (5), a regulating gap (14) located at a larger diameter. Moreover, the floating ring (4) disposed so that it can move freely in the annular chamber (6) forms with its interior diameter toward the rotating component (1) a choke gap (15) with axial flow-through and forms with its external diameter toward the casing wall (7) the choke gap (16) with axial flow through. The projections (11, 12) may also be designed as part of the walls (5) or (8).

Due to the arrangement of the regulating gaps (13, 14) and the choke gaps (15, 16), the floating ring (4) will in the presence of a pressure difference (P1)>(P2) adjust itself between the walls (8, 5) without coming into contact with them. As a result of the hydrodynamic effect of the slight leakage current flowing through the choke gaps (15, 16), the floating ring (4) will also be supported without contact in the radial direction. Due to the rotating walls (5) and (17), with the latter representing the surface of the rotating component, the floating ring (4) will assume a speed that corresponds to approximately half the speed of the rotating component (1). That results from the drive torques of the rotating walls and the braking torques of the stationary walls. The absence of axial contact results from an automatically-adjusting equilibrium of the pressure and surface products in the chambers (18, 19).

In the borderline case in which the regulating gap (14) approaches zero, the pressure in chamber (18) will correspond approximately to pressure (P1) and therefore be greater than the pressure in chamber (19), which corresponds approximately to the lower pressure (P2). Consequently, the floating ring (4) is displaced in the axial direction to the left toward the wall (8), thereby opening the regulating gap (14). In the opposite case, in which the regulating gap (13) approaches zero, there is high pressure (P1) in chamber (20), while there is lower pressure in chamber (18), which corresponds approximately to pressure (P2). As a result, the floating ring is displaced in the axial direction to the right toward the wall (5), so that regulating gap (13) opens. During operation, absence of contact of the floating ring (4) is thereby adjusted automatically, thereby ensuring absence of abrasion.

FIG. 2 shows a two-stage embodiment of the floating-ring seal, which, for example, can be installed on the casing end of a centrifugal pump casing. Two stages were chosen in this case for reasons of simplicity and clarity of the illustration. However, the number of stages can also be increased without further effort as a function of the pressure differences to be blocked. In this case, the high pressure side (P1) can correspond to the pump pressure. To cool the leakage current of a hot pumping medium, this floating-ring seal design is also provided with a sealing water flow (21), which can for example be removed from the first pumping stage and reduced to an acceptable level using a heat exchanger (22). During operation, the freely-floating and self-adjusting floating rings (4) provide a minimum leakage current. When the equipment is turned off, a shut-off seal (23) prevents the liquid from being discharged. As a result of the effect of the braking torque on the floating rings (4) caused by the stationary walls, the ring will assume a speed that is always lower than that of the rotating part (1). That results in relative speeds between the parts that are much lower than those of systems of prior art. That represents a significant advantage with regard to the problem of the materials used in the parts that move against each other with a narrow gap. To reduce the medium flowing through the choke gaps (15, 16), the floating rings are equipped with a honeycombed surface structure (24) that opens toward the exterior.

FIG. 3 shows an example of an embodiment in which the rotating component (1) is part of an impeller neck of a centrifugal pump impeller. A disk (3) rotates along with it. The casing (2) with stationary walls is located opposite the rotating parts. Between the parts there is formed the annular chamber (6) within which the floating ring (4) is disposed so that it can move freely in its function as an impeller split ring in accordance with the previous embodiments.

The embodiment in accordance with FIG. 4 takes into account the special operating conditions of centrifugal pumps. Their rotating components are subject to greater axial movements, which are caused by the bearing clearance of the axial bearings, assembly and process tolerances, and thermal expansion. To compensate for very large axial movements, the regulating gaps (13, 14) described in FIG. 1 must be made proportionally larger. That can be avoided by the embodiment in FIG. 4. The projections (11, 12) of the floating ring (4) in this case engage in recess (25) in the casing (2) and recess (26) in the rotating disk (3). The regulating gaps (13, 14) are axially larger, and to them are added regulating gaps (27, 28) with axial flow-through that change their length during axial displacement of the floating ring (4). In the case of axial displacement of the rotating part having the disk (3) affixed to it, this measure allows equalization of the displacement with simultaneous limitation of the leakage current. Of course, dimensions are designed in such a way that the regulating gaps (27, 28) are retained during maximum axial displacement and that during the slightest axial displacement, the floating ring (4) does not touch the walls adjoining it. The functional principle corresponds to the embodiment described in FIG. 1.

The embodiment shown in FIG. 5 uses a two-part floating ring (4.1, 4.2) instead of the additional regulating gaps (27, 28) in accordance with FIG. 4. A sliding fit (29) and a spring element (30) between the floating-ring parts (4.1, 4.2) allow compensation of excessive axial changes. The spring element (30) can be designed as a one-piece component or as spring elements distributed over the periphery. The strength of the spring element or elements (30) is adapted to the individual pressure ratios to be blocked. As a result of the movement of the floating-ring parts (4.1, 4.2) in relation to each other, it is possible to allow large axial relative movements while still leaving the regulating gaps (13, 14) small, thereby keeping the leakage current between the chambers (P1) and (P2) as small as possible. The reduction of the leakage current is supported in that regard by the honeycombed surface structure (24).

The embodiment shown in FIG. 6 illustrates a floating ring (4) whose length is a multiple of its height. The honeycombed surface structure is also applied on the side of the casing (2) facing the floating ring (4). Due to its great length and the long choke gaps (15, 16) with flow-through in the axial direction, this floating ring has a strong vibration damping effect on the rotating system. With multistage pumps having large axial lengths, the entire vibrational behavior of the rotating part can be positively influenced.

I claim:

1. A floating-ring seal for sealing a rotating component, arranged between two chambers each having a different pressure level comprising:

at least one floating ring, said at least one floating ring being disposed in an annular chamber, said annular chamber being decreed by a first wall and a second wall that are disposed axially opposing each other, said first wall and said second wall each being disposed in radial and axial planes;

said first wall including two portions disposed at an angle with respect to each other, said first wall having means for rotating at a first predetermined speed;

said second wall including two portions being disposed axially opposing said two portions of said first wall, said second wall being fixed with respect to said first wall, a plurality of sealing gaps being disposed between said first wall and said second wall, said sealing gaps permitting fluid to flow through said sealing gaps, said at least one floating ring moving freely in said annular chamber such that a plurality of regulating gaps are disposed between a surface of the floating ring and one of the portions of said first wall and said second wall, and wherein at least two of said regulating gaps are disposed at different diameters.

2. A floating-ring seal in accordance with claim 1 wherein one of an external and an internal circumferential surfaces of said floating ring includes an open, honeycombed surface structure.

3. A floating-ring seal in accordance with claim 2 wherein one of an external and an internal circumferential surfaces of the walls opposite said floating ring include an open, honeycombed surface structure.

4. A floating-ring seal in accordance with claim 1 wherein the cross section of said floating ring has an axial length that is at least three times a thickness of said floating ring.

5. A floating-ring seal in accordance with claim 1 wherein a projection is affixed to a surface of one of said first and second walls and said floating ring, said projection being inserted into a corresponding shaped recesses in the other one of said first and second walls and said floating ring.

6. A floating-ring seal in accordance with claim 1 wherein said floating ring is comprised of two parts and said two parts move axially with respect to each other.

7. A floating-ring seal in accordance with claim 6 wherein said two parts are connected together by at least one spring.

8. A floating-ring seal in accordance with claim 1 wherein said at least one floating ring has means for rotating at a second predetermined speed which is less than said first predetermined speed.

9. A floating-ring seal in accordance with claim 8 wherein said second predetermined speed is approximately half of said first predetermined speed.

* * * * *